United States Patent [19]

Takeda et al.

[11] Patent Number: 5,282,676
[45] Date of Patent: Feb. 1, 1994

[54] COMBINED ANTISKID AND TRACTION CONTROL ELECTRONIC BRAKE SYSTEM

[75] Inventors: Kenji Takeda; Hiroshi Ogawa; Mitsuo Inagaki, all of Okazaki, Japan

[73] Assignee: Nippon Soken Inc., Nishio, Japan

[21] Appl. No.: 798,714

[22] Filed: Nov. 27, 1991

[30] Foreign Application Priority Data

Nov. 29, 1990 [JP] Japan .................. 2-334367

[51] Int. Cl.$^5$ .................. B60T 8/32; B60T 8/44
[52] U.S. Cl. .................. 303/113.2; 303/116.1; 303/116.2
[58] Field of Search .................. 303/113.2, 116.1, 116.2

[56] References Cited

U.S. PATENT DOCUMENTS

| 4,738,493 | 4/1988 | Iragaki et al. | 303/116.1 |
| 4,872,730 | 10/1989 | Takagi et al. | 303/92 |
| 4,900,102 | 2/1990 | Jonner | 303/113.2 |

FOREIGN PATENT DOCUMENTS

| 61-263859 | 11/1986 | Japan . |
| 2-18153 | 1/1990 | Japan . |
| 2-18150 | 5/1990 | Japan . |

*Primary Examiner*—Robert J. Oberleitner
*Assistant Examiner*—Chris Schwartz
*Attorney, Agent, or Firm*—Cushman, Darby & Cushman

[57] ABSTRACT

A brake system capable of implementing anti-skid and traction control operations has an electromagnetic valve for connecting a master cylinder to a wheel cylinder and for disconnecting the master cylinder from the wheel cylinder when anti-skid or traction control is executed. A piezo-electric hydraulic pump is provided for introducing high-pressure brake oil when anti-skid or traction control is executed. A pressure reduction valve selectively introduces and removes brake oil so that a desired wheel cylinder pressure can be attained when anti-skid or traction control is executed. A hydraulic switching valve is connected to the main oil pressure line parallel to the electromagnetic valve and allows pressure in the master cylinder to be opened to the wheel cylinder during a braking operation. The system also includes a unit for establishing one-way communication from the wheel cylinder to the master cylinder during anti-skid control to prevent pressure in the wheel cylinder from being higher than that in the master cylinder while preventing connection between the master cylinder and the wheel cylinder during traction control.

8 Claims, 8 Drawing Sheets

COMBINED ANTISKID AND TRACTION CONTROL ELECTRONIC BRAKE SYSTEM

BACKGROUND OF THE INVENTION

1. Field of the Invention

The present invention relates to a brake device, and more particularly to a brake device provided with an anti-skid mechanism and/or traction control mechanism.

2. Description of Related Arts

An anti-skid brake (below, ABS) device for a vehicle capable of preventing the locking of wheels of the vehicle during a braking operation, or an antitraction (below, TRC) device capable of preventing a free rotation of the wheels during the starting or acceleration of the vehicle has heretofore been proposed. These ABS and TRC devices can stabilize the movement of the vehicle and can also make the vehicle much more safe.

In these devices, there is provided a mechanism for controlling the pressure in a brake cylinder (wheel cylinder) to obtain a desired operation for preventing the locking or free rotation of the wheels of the automobile.

In both of the ABS and TRC systems, the pressure in the wheel cylinder is controlled to obtain the respective desired operations, and therefore, that one and the same hydraulic circuit be used for both the ABS and TRC systems has heretofore been desired.

However, the employment of one and the same hydraulic circuit for both the ABS and TRS systems is very difficult without making the device very large.

SUMMARY OF THE INVENTION

An object of the present invention is to provide a brake system for a vehicle with TRC and ABS controls, with a reduced size by employing the same oil pressure source for both the TRC control and the ABS control.

According to the present invention, a brake system is provided for a wheel in a vehicle capable of obtaining an anti-skid operation for preventing the locking of the wheels when the wheels are subjected to a brake operation as well as a traction control operation for preventing the free rotation of the wheels when the vehicle is started or accelerated, said system comprising:

a brake pedal;

a reservoir tank for storing a brake fluid under atmospheric pressure;

a master cylinder connected to the brake pedal for generating a hydraulic pressure when the brake pedal is depressed;

a wheel cylinder arranged in the wheel of the vehicle for obtaining a braking operation when the hydraulic pressure is applied thereto;

main conduit for connecting the master cylinder with the wheel cylinder;

cut-off valve means arranged in the main conduit for disconnecting the wheel cylinder from the master cylinder when said anti-skid operation or traction control operation is required;

relief conduit for connecting the main conduit, at a position between the cut-off valve and the wheel cylinder, with the reservoir tank for returning an amount of brake fluid into the tank;

relief valve means arranged in the relief conduit for obtaining a communication between the wheel cylinder and the reservoir tank when a reduction of pressure in the wheel cylinder is required during said anti-skid control or said traction control;

supply conduit for connecting the main conduit, at a position between the cut-off valve means and the wheel cylinder, with the reservoir tank, and;

pump means arranged in said supply conduit and operated intermittently to supply the brake fluid from the reservoir tank to the wheel cylinder when an increase in the pressure in the wheel cylinder is required during said anti-skid control or said traction control.

According to the construction of the present invention, the first valve means (pressure shut-off valve) is arranged on the main hydraulic pressure conduit for disconnecting the wheel cylinder to the master cylinder when both the anti-skid control and the traction control are carried out. Upon TRC and ABS control, the second valve means (pressure reduction valve) connects the wheel cylinder with the reservoir tank when the pressure in the wheel cylinder is reduced, and disconnects the wheel cylinder with the reservoir tank when the pressure in the wheel cylinder is increased to allow the brake fluid in the reservoir tank to be supplied to the wheel cylinder from the pump.

According to the present invention, one and the same hydraulic pressure source together with a hydraulic circuit are used for both the TRC and ABS controls. As a result, the number for constructing the hydraulic system can be reduced, permitting the system to be small in size.

DESCRIPTION OF THE PREFERRED EMBODIMENTS

A problem to be solved in the present invention will be further described with reference to FIG. 1 which shows a prior art ABS device having a conventional hydraulic pressure circuit of return flow type, wherein an element, which becomes a hydraulic pressure source to obtain an increased pressure in a wheel cylinder 7, is a master cylinder 1, which produces a hydraulic pressure generated when an operator depresses the brake pedal 2. A motor driven pump 71 is provided mainly for forcibly supplying a brake fluid in a reservoir 76 to the master cylinder 1 when there is a reduction in the pressure in master cylinder 1. In other words, the motor pump is not for directly increasing the pressure but for supplementing the pressure in the master cylinder 1.

Since the brake pedal 2 is usually not depressed when the TRC control is carried out, and therefore, the master cylinder 1 cannot be used as a pressure source to obtain an increased pressure, and therefore a separate, new pressure source is required. As a result, independent devices such as a motor driven pump 72, accumulator 73, and a pressure sensor 74 are required for obtaining TRC control, which makes the total hydraulic system complicated and large sized.

Figure 1:
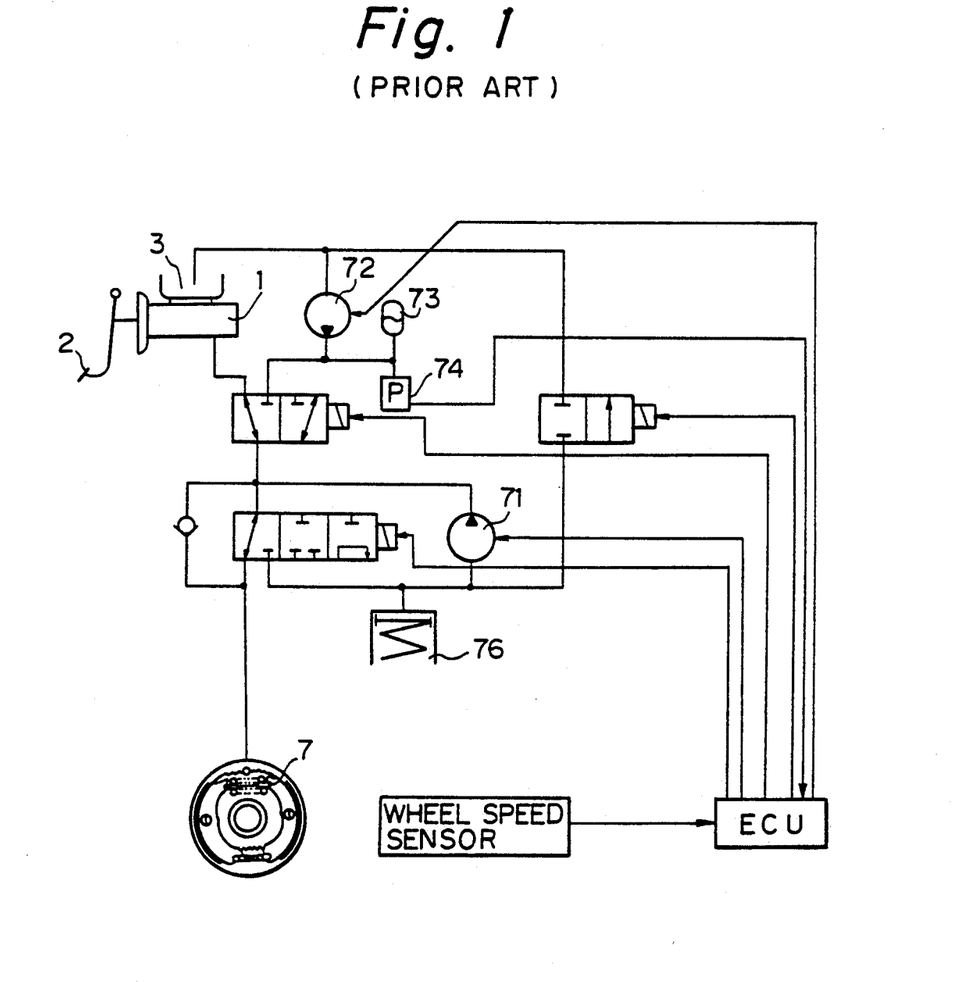
FIG. 1 is a general schematic view of the brake system with ABS and TRC systems in the prior art.
Figure 2:
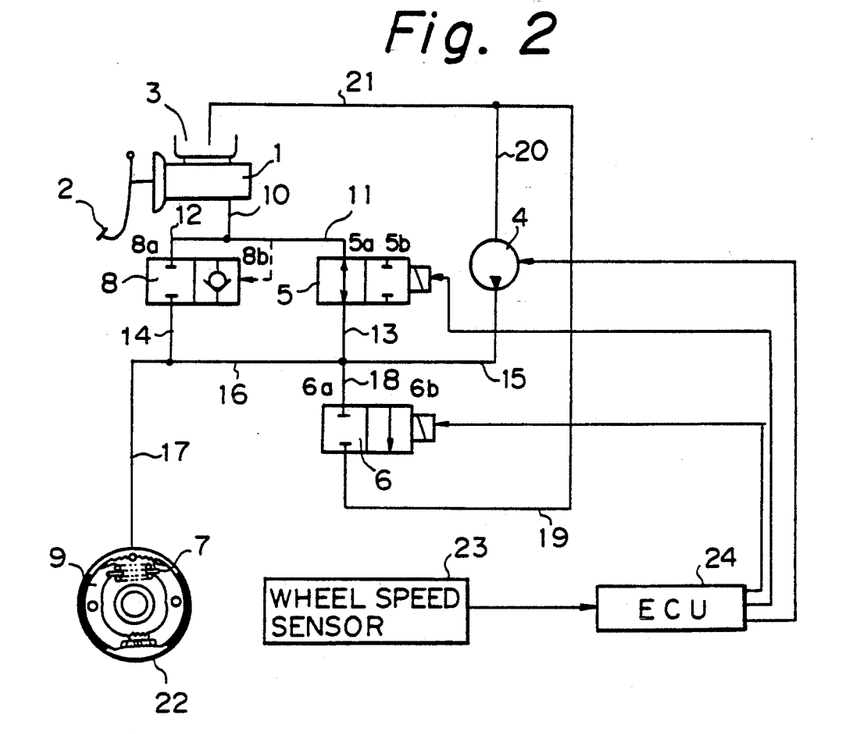
FIG. 2 is a general schematic view of the brake system according to the present invention.

In FIG. 2 showing a first embodiment of the present invention, capable of overcoming the above mentioned difficulty in the prior art in FIG. 1, a master cylinder 1, which is operated by a brake pedal 2, is connected to a wheel cylinder 7 via main oil conduits 10, 11, 13, 16 and 17. The wheel cylinder 7 is provided for a wheel 22, and is connected to brake shoes 9. Only one wheel cylinder 7 is shown in FIG. 1, but, the main hydraulic pressure conduit 17 is connected to a plurality of such wheel cylinders 7. It is, however, possible to provide separate hydraulic lines for respective cylinders.

An electromagnetic two position valve 5 is arranged between the main hydraulic conduits 11 and 13, and is controlled in an on-off manner by means of an electric control unit (below, ECU) 24. This electromagnetic valve 5 is for selectively opening or closing a communication between the master cylinder and the wheel cylinder 7.

The main hydraulic pressure line is connected to a reservoir tank 3 via a relief conduit 18, an electromagnetic two position valve (pressure reduction valve) 6, and relief conduits 19 and 21. When the electromagnetic pressure reduction valve 6 is ON, a brake fluid in the wheel cylinder 7 is issued to the reservoir tank 3.

A piezo-electric hydraulic pump 4 is arranged between the relief conduit 15 connected to the main conduit 17 and a relief conduit 20 connected to the conduit 21 to the reservoir tank 3. The oil pump 4 is for supplying brake oil held in the reservoir tank 3 to the wheel cylinder 7 under pressure.

Furthermore, a pressure switching valve 8 as a two position valve is arranged between the master cylinder 1 and the wheel cylinder 7 by means of communication conduits 12 and 14. The pressure switching valve 8 is arranged parallel to the mode selection valve (shut-off valve) 5.

The hydraulic pressure switching valve 8 changes from a connected position 8b to a disconnected position 8a in accordance with the pressure condition in the master cylinder 1. Namely, when no pressure is generated in the master cylinder, i.e., a braking operation is not initiated by the driver, the valve 8 effects a disconnected position 8a, so that the master cylinder 1 and the wheel cylinder 7 are disconnected from each other. Contrary to this, when a pressure is generated in the master cylinder 1 due to the execution of a brake operation by the driver, the valve 8 effects a one way connection position where a single way from the wheel cylinder 7 to the master cylinder 1 is obtained, while the return of brake oil in the opposite direction is prevented.

A sensor 23 for detection of the speed of the wheel 22 is connected to the control circuit 24, and a signal indicative of said speed is introduced into the circuit 24. The control circuit 24 is connected to the piezo-electric hydraulic pump 4, the electromagnetic mode control valve 5, and electromagnetic pressure reduction valve 6, and issues signals to these parts 4, 5 and 6 for operating them.

Figure 3:
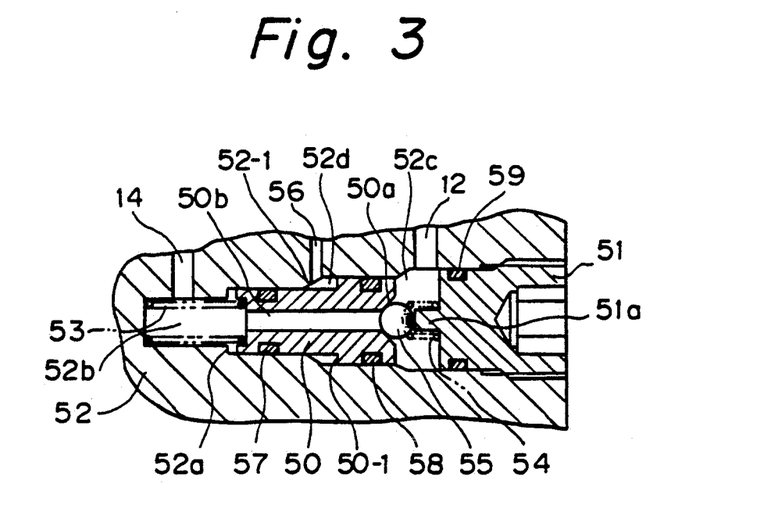
FIG. 3 shows a cross sectional view of the hydraulic pressure switching valve in FIG. 2.

FIG. 3 is a cross sectional view, showing a detailed construction of the pressure switching valve 8. In FIG. 3, the valve 8 has a spool 50 of stepped cross-sectional shape having a large diameter portion and a small diameter portion. The spool 50 is slidably arranged in a housing 52. The spool 50 forms a bore 50b therethrough, the bore of which terminates as a taper portion 50a at its large diameter portion. The housing 52 defines a stepped bore to which the spool 50 is slidably inserted, so that a chamber 52b is formed between the spool 50 and the housing 52. The stepped bore forms an annular shoulder as a stopper portion 52a for limiting the axial position of the spool 50. A spring 53 is arranged in the chamber 52b for urging the spool 50 such that the spool 50 is moved away from the stopper portion 52a. The conduit 14 to the wheel cylinder 7 (FIG. 2) is opened to the chamber 52b. The valve 8 is also provided with a plug 51 which is screw engaged with the bore in the housing 52, so that a chamber 52c is formed between the housing 12, the spool 50 and the housing 52. The conduit 12 to the master cylinder 1 (FIG. 2) is opened to the chamber 52c. The plug 51 integrally extends from a stopper portion 51a along the axis thereof toward the taper portion 50a. A ball 55 is arranged between the taper portion 50a and the stopper portion 51a. A spring 54 urges the ball 55 in the left-hand direction in FIG. 3, so that the ball 55 is seated on the taper portion 50a. It should be noted that the spring 53 can obtain a greater force than that obtained by the spring 54, so that the ball 55 is urged to contact with the stopper portion 51a as shown in FIG. 3.

In FIG. 3, the spool 50 forms an annular shoulder portion 50-1, while the housing 52 forms an annular shoulder portion 52-1. An atmospheric pressure chamber 52d of an annular shape is formed between the shoulder portions 50-1 and 52-2, chamber 52d of which is opened to the atmosphere via a vent hole 56. Reference numerals 57, 58 and 59 show 0-rings for obtaining a necessary sealing function.

Now, an operation of the pressure switching valve 8 of the above mentioned construction will be described. When the brake pedal 2 is not depressed, the pressure of the master cylinder 1 opened to the chamber 52c is small enough so that the spring 53 moves the spool 50 in the right-hand direction in FIG. 3, causing the ball 55 to contact with the stopper portion 51a of the plug 51, while the ball 55 is seated on the taper portion 50a. As a result, the bore 50b opened to the conduit 14 to the wheel cylinder 7 is disconnected to the chamber 52c opened to the conduit 12 to the master cylinder 1, which corresponds to the closed position 8a in FIG. 2. When the pressure switching valve 8 is in a closed position 8a, the increase in the pressure in the wheel cylinder 7 only causes the spool 50 to move in the right-hand direction, causing the spool 50 to engage with the ball 55. As a result, the closed position 8a of the pressure switching valve 8 is maintained.

When the brake pedal 2 is depressed, a pressure is generated in the master cylinder 1. The increase in the pressure in the master cylinder 1 opened to the chamber 52c causes the spool valve 50 to move in the left-hand direction in FIG. 2 when the force by the pressure in the chamber 52c is larger than the force by the spring 53, which is, for an example, between 0.1 to 0.2 Mpa, until the spool 50 contacts the shoulder 52a. In this movement of the spool 50, the ball 55 moves together with the spool 50 while the ball 55 contacts the taper portion 50a due to the force of spring 54, which causes the ball 55 to be detached from the stopper portion 51a. As a result, the ball 55 is now ready to release the oil from the chamber 52b connected to the wheel cylinder 7 via the pipe 14 to the chamber 52c connected to the master cylinder 1 via the pipe 12. When the pressure level in the master cylinder 1 is higher than that in the wheel cylinder 7, a force is applied to the ball 55 so that it is pressed to the taper portion 50a, which causes the bore 50b for connection with the master cylinder 1 with the wheel cylinder 7 to be disconnected from each other. Contrary to this, a pressure difference is created in a manner such that the pressure in the master cylinder 1 is smaller than the pressure in the wheel cylinder 7, so that the ball 55 is detached from the taper portion 50a. As a result, the brake oil from the wheel cylinder 7 can return, via the conduit 14, the chamber 52b, the hole 50b, the chamber 52c and the conduit 12, to the master cylinder 1. Thus, the pressure in the wheel cylinder 7 is prevented from being larger than that in the master cylinder 1.

Now, the purpose of the oil pressure switching valve 8 in the above mentioned construction will be explained. The ABS (anti skid control) system is designed for maintaining a desired pressure in the wheel cylinder 7. In this regard, it is not desirable that the pressure in the wheel cylinder 7 is higher than the pressure in the master cylinder 1 in which a pressure is generated when a driver depresses the brake pedal 2. This is because the pressure in the master cylinder 1 is indicative of the degree of speed reduction intended by the driver, so that the pressure in the wheel cylinder 7 must not be controlled under a pressure larger than the pressure indicative of the degree of speed reduction. Therefore, it is required that during the ABS control, the pressure in the wheel cylinder 7 is controlled so as not to exceed the pressure in the master cylinder 1 (below first requirement).

Contrary to this, during the traction control (TRC control), the pressure in the master cylinder 1 is equal to zero, because the driver does not depress the brake pedal 2. Nevertheless, the TRC control requires that there be some pressure in the wheel cylinder 7. In other words, during the TRC control, it is required that pressure in the wheel cylinder 7, larger than the atmospheric pressure, is obtained irrespective of the fact that there is no pressure in the master cylinder (below, second requirement).

As will be seen from the above discussion, in order to use the same parts for the ABS control and TRC control as in the embodiment, it is required that both of the above first and second requirements should be satisfied. The hydraulic pressure switching valve 8 can satisfy the above mentioned requirement. Namely, when there is a pressure in the master cylinder 1, i.e., the brake pedal 2 is depressed, the spool 50 is moved in the left-hand direction in FIG. 3, causing the ball 55 to be detached from the stopper 51a. Thus, the ball 55 controls the pressure in the wheel cylinder 7 so that the pressure in the wheel cylinder 7 does not exceed the pressure in the master cylinder 1. Namely, the pressure in the wheel cylinder 7, larger than the pressure in the master cylinder 1, causes the ball 55 to be lifted from the taper portion 50a to connect the bore 50b opened to the wheel cylinder 7 with the chamber 52c opened to the master cylinder, which maintains a pressure in the wheel cylinder 7 not larger than that in the master cylinder 1 during the ABS control operation. Thus, the first requirement can be satisfied. Contrary to this, when there is no pressure in the master cylinder 1, the spring 53 moves the spool 50 in the right-hand direction, so that ball 55 is locked between the spool 50 and stopper 51a. Thus, the wheel cylinder 7 is disconnected from the master cylinder 1. As a result, during the TRC control, the increased pressure in the wheel cylinder 7 without generating the pressure in the master cylinder is maintained without being discharged into the master cylinder 1. Thus the second requirement can be satisfied. It should be, however, noted that the hydraulic pressure switching valve 8 is not an indispensable element for constructing the present invention.

Figure 4:
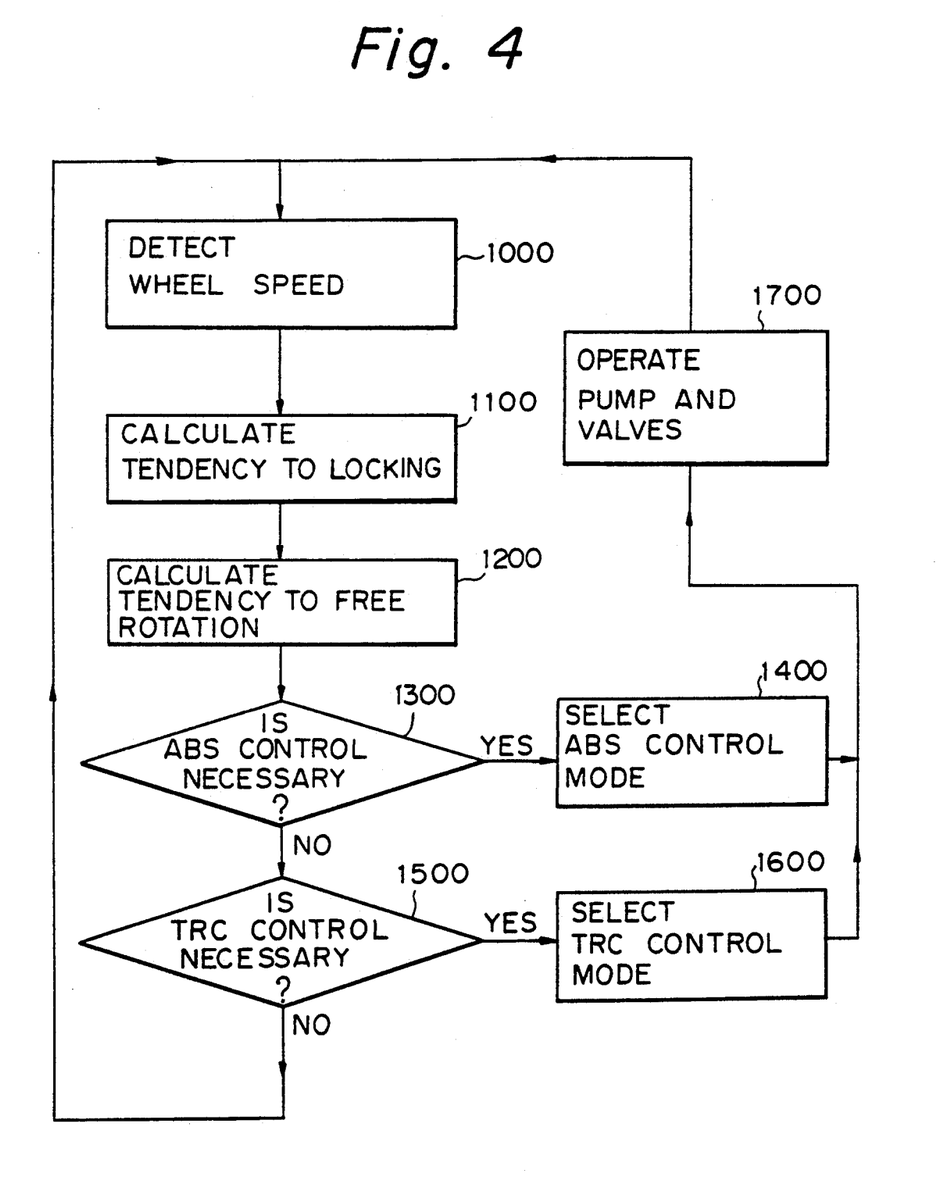
FIGS. 4 to 7 are flow charts for illustrating the operation of the present invention.

The operation of the above mentioned construction will now be explained with reference to flow charts shown in FIGS. 4 to 7. In FIG. 4, at step 1000, a speed of the wheel detected by the wheel speed sensor 23 made as an electromagnetic pick up is read out. At step 1100, a calculation of various information related to the tendency to lock wheels is carried out from the detected speed of the rotational speed of the wheel. In order to do this, first, calculation of various factors for determination of a condition of a wheel, such as a slip ratio of the wheel, rotational speed of the wheels, and rotational speed variation ratio (degree of the acceleration) of the wheels are carried out. Then, from these factors, a calculation for various information for the determination of a tendency of locking is carried out, which is indicative for determination if a wheel is tending to a locked position or if a wheel is recovering from the locked position. At step 1200, a calculation of various information related to a tendency to free rotation of a wheel (rotation with no grip) is carried out. In order to do this, based on the slip ratio of the wheel, rotational speed of the wheels, and rotational speed variation ratio of the wheels, a calculation for various information for determination of the tendency of a free rotated state of a wheel is carried out, which is indicative for determination if a wheel is tending to a free rotated condition or if a wheel is recovering from a free rotated state.

At step 1300, it is determined if it is necessary to execute ABS control based on the various information on the tendency of an occurrence of a wheel locking, as obtained at step 1000. When it is determined that ABS control is necessary, the routine goes to step 1400, where an ABS control mode for the wheel cylinder 7 is selected between a pressure increasing mode, pressure holding mode, and a pressure reducing mode, and the routine proceeds to step 1700.

When it is determined that the ABS control is not necessary at step 1300, the routine goes to step 1500, where it is determined if a TRC control is necessary. When it is determined that the TRC control is necessary, the routine proceeds to step 1600, where a TRC control mode for the wheel cylinder 7 is selected between a pressure increasing mode, pressure holding mode, and a pressure reducing mode, and the routine proceeds to step 1700.

At step 1700, in accordance with the result of the mode selection at step 1400 or 1600, operation of the electromagnetic mode selection valve 5, electromagnetic pressure reducing valve 6 and the piezo-electric oil pressure pump 4 are determined, and respective signals are supplied to the valves 5 and 6, and the pump 4.

The operation of the wheel cylinder 7 at the respective three modes are shown in the following Table 1.

TABLE 1

| | Electromagnetic Mode Selection Valve 5 | Electromagnetic Pressure Reduction Valve 6 | Piezoelectric Hydraulic Pressure Pump 4 |
|---|---|---|---|
| Increase Pressure | 5b | 6a | ON |
| Hold Pressure | 5b | 6a | OFF |
| Decrease Pressure | 5b | 6b | OFF |

As will be seen from the above table, irrespective of the mode as selected, the electromagnetic valve 5 is situated to disconnect the master cylinder 1 to the wheel cylinder 7, so long as the ABS control or TRC control is carried out.

The electric control circuit 24 shown in FIG. 2 executes the above mentioned operation and explanations will be done with reference to step 1400 for the selection of an ABS control mode and step 1600 for the selection of a TRC control mode, and step 1700 for the determination of the operation of the electromagnetic mode selection valve 5, the electromagnetic pressure reducing valve 6 and the piezo-electric oil pressure pump 4.

Figure 5:
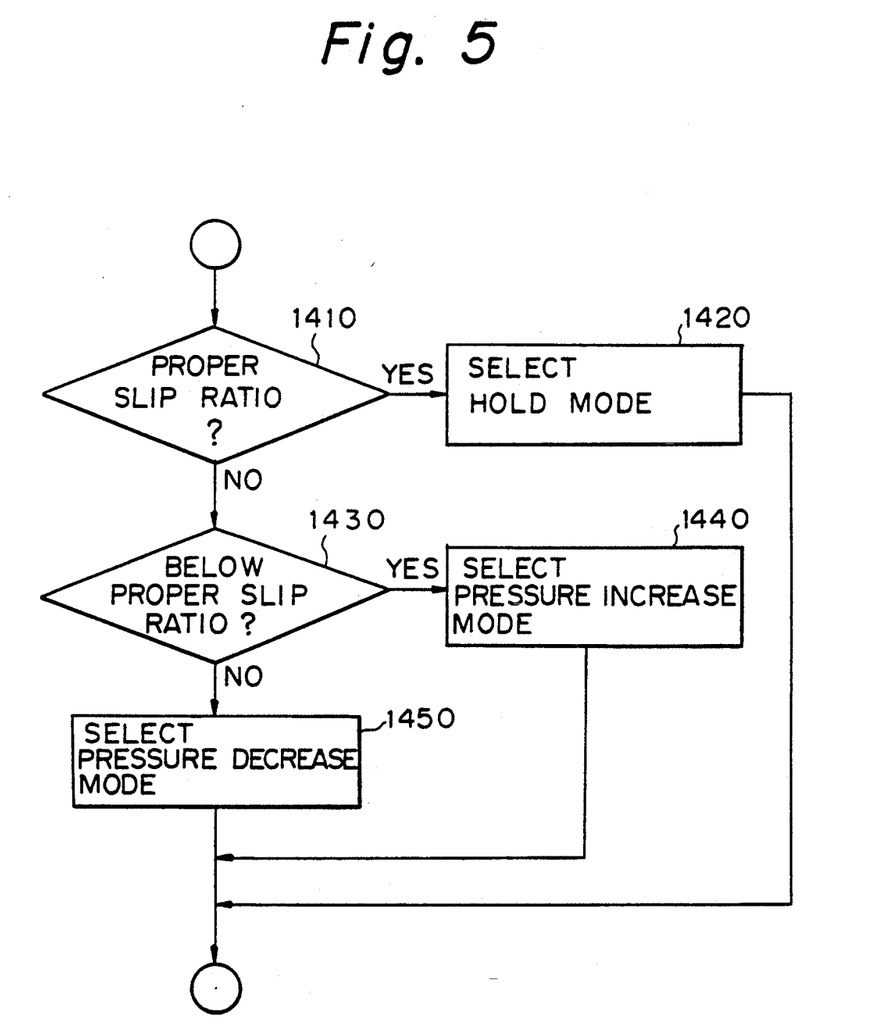

FIG. 5 shows a flowchart for obtaining the ABS control mode at step 1400 in FIG. 4. At step 1410, it is determined if the slip ratio is equal to a predetermined proper slip ratio. The slip ratio S during a braking operation is obtained by the following equation, $$S = (V - R \times \omega)/V,$$

where V is a speed of vehicle, R is a radius of a wheel, and $\omega$ is an angular speed of the wheel. When the slip ratio has a proper slip ratio (yes result at step 1410), the routine goes to step 1420, where the holding mode is selected. When the slip ratio is not proper (i.e., a "No" result at step 1410) the routine goes to step 1430, where it is determined that the slip ratio as calculated is smaller than the proper slip ratio. When it is determined that the calculated slip ratio is smaller than the proper slip ratio (yes result at step 1430), the routine goes to step 1440, where the pressure increasing mode is selected. When it is determined that the calculated slip ratio is not smaller than the proper slip ratio (no result at step 1430), the routine goes to step 1450, where the pressure decreasing mode is selected. As will be seen from the above, the selection of the ABS control mode is determined in accordance with a value of the slip ratio.

Figure 6:
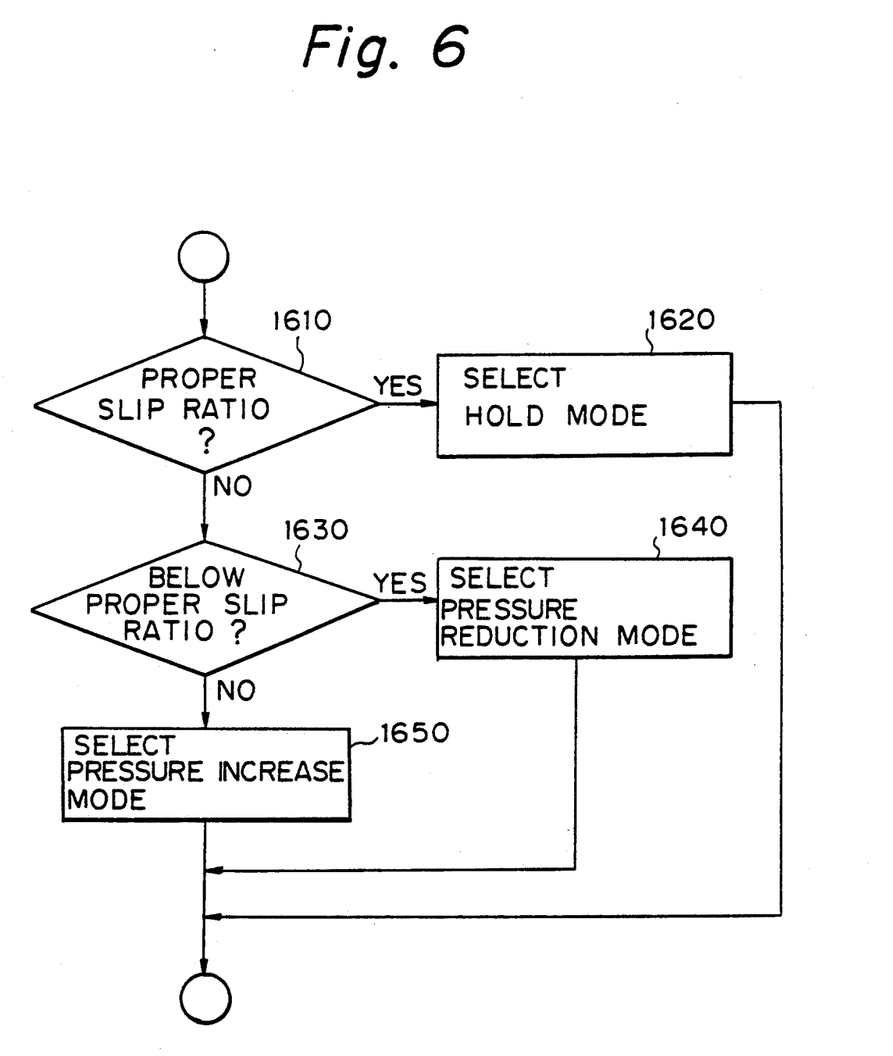

FIG. 6 shows a flowchart for obtaining the TRC mode at step 1600 in FIG. 3. At step 1610, it is determined if the slip ratio is equal to a predetermined proper slip ratio. The slip ratio S' during a braking operation is obtained by the following equation.

$$S' = (R \times \omega - V)/(R \times \omega),$$

where V is a speed of vehicle, R is a radius of a wheel, and $\omega$ is an angular speed of the wheel. When the slip ratio S' has a proper slip ratio (yes result at step 1610), the routine goes to step 1620, where the holding mode is selected. When the slip ratio is not proper (no result at step 1610), the routine goes to step 1630, where it is determined whether the slip ratio as calculated is smaller than the proper slip ratio. When it is determined that the calculated slip ratio is smaller than the proper slip ratio (yes result at step 1630), the routine goes to step 1640, where the pressure increasing mode is selected. When it is determined that the calculated slip ratio is not smaller than the proper slip ratio (no result at step 1630), the routine goes to step 1650, where the pressure decreasing mode is selected. As will be seen from the above, the selection of the TRS control mode is also determined in accordance with a value of the slip ratio.

Figure 7:
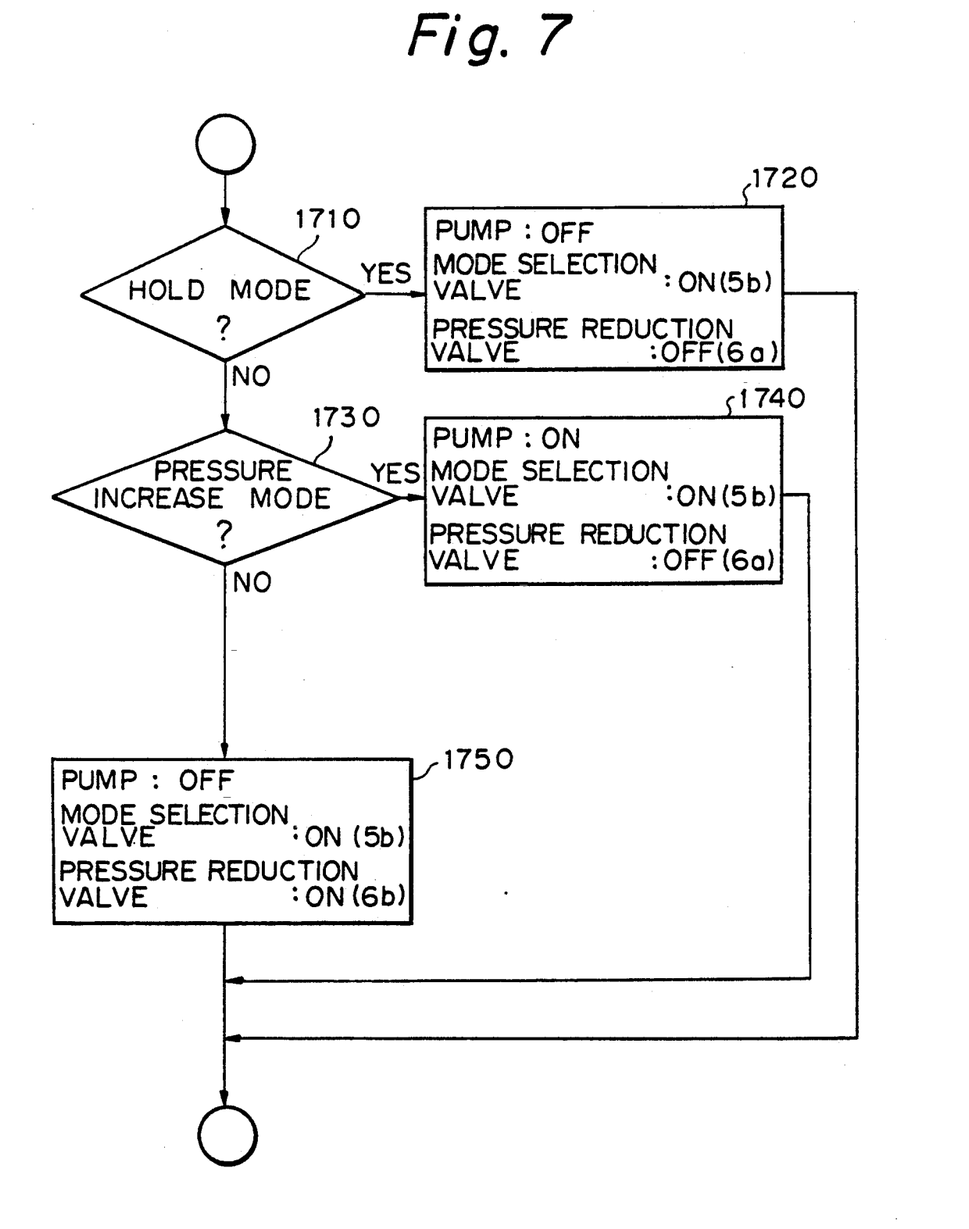

FIG. 7 shows, in detail, a flow chart of step 1700 for determination of the operation of the electro-magnetic mode selection valve 5, the electromagnetic pressure reducing valve 6 and the piezo-electric oil pressure pump 4. At step 1710, it is determined if the selection determined at the step 1300 or 1600 is a holding mode. When it is determined that the holding mode is selected, the routine goes to step 1720, where, in accordance with the above mentioned table, the electric mode selection valve 5 is ON to take the closed position 5b, the electromagnetic pressure reduction valve 6 is OFF to take the closed portion 6a, and the piezo-electric hydraulic pressure pump 4 is OFF.

When it is determined that the mode to be selected is not a holding mode at the step 1710, the routine goes to step 1730 where it is determined if the selected mode is a pressure increasing mode. When it is determined that the mode to be selected is a pressure increasing mode, the routine goes to step 1740, where in accordance with the above mentioned table, the electric mode selection valve 5 is ON to take the closed position 5b, the electromagnetic pressure reduction valve 6 is OFF to take the closed portion 6a, and the piezo-electric hydraulic pressure pump 4 is ON.

When it is determined that the mode to be selected is not a pressure increasing mode at the step 1730, it is determined that the mode to be selected is the pressure reduction mode. Then, the routine goes to step 1750, where, in accordance with the above mentioned table, the electric mode selection valve 5 is ON to take the closed position 5b, the electromagnetic pressure reduction valve 6 is ON to take the open portion 6b, and the piezo-electric hydraulic pressure pump 4 is OFF.

The operation of the brake system according to the present invention as described can assist in obtaining a stabilized running as described herein below with reference to FIGS. 2 to 7. When the pressure in the wheel cylinder 7 is very high, or when the friction coefficient of the surface of the road is very small, a locking of a vehicle can easily take place thereby increasing the braking distance or causing loss of control. In such situations the construction of the present invention as explained above operates as follows to stabilize the movement of the vehicle. Namely, a tendency for the occurrence of wheel locking under a strong braking force (a high pressure in the wheel cylinder 7) is determined at step 1100, the electronic control unit 24 issues a signal for switching the electromagnetic mode selection valve 5 from the open position 5a to the closed position 5b, so that the wheel cylinder 7 is disconnected from the master cylinder 1. When the tendency of the locking is not suppressed by the closure of the electromagnetic mode selection valve 5, the electromagnetic pressure reduction valve 6 is switched from the close position 6a to the open position 6b, so that wheel cylinder 7 is opened to the reservoir tank 3 so that the oil in the wheel cylinder 7 is discharged to the reservoir tank 3 for reduction of the pressure in the wheel cylinder 7. As a result of the reduction of the pressure in the wheel cylinder 7, the braking force at the wheel cylinder 7 is reduced to cancel the locked state of the wheel. When the locking is suppressed because of the reduction of the braking force, the control circuit 24 issues a signal for switching the electromagnetic pressure reduction valve 6 from the open position 6b to the close position 6a for holding the braking force.

When the rotational speed of the wheel is too slow under the holding mode, the control circuit 24 issues a signal for operating the piezo-electric hydraulic pump 4, so that the brake fluid in the reservoir tank 3 is supplied to the wheel cylinder 7 to increase the braking force. When a tendency for a locked condition appears in the wheel, the control circuit 24 issues a signal for stopping the rotation of the pump 4, for holding the pressure in the wheel cylinder 7, and the electromagnetic mode selection valve 5, the electromagnetic pressure reduction valve 6 and the piezoelectric hydraulic pressure pump 4 wait for the incoming signals.

When the frictional coefficient of a load is small, an excessive depression of an accelerator pedal causes the driving wheel of the vehicle to rotate freely without gripping the load, which may decrease acceleration performance of the vehicle and reduce the stability of the vehicle. In this situation as occurred, the device in the first embodiment can maintain running stability in the following way. Namely, when it is detected that the wheel has a tendency to freely rotate at the step 1200 in FIG. 4, the electromagnetic mode selection valve 5 is moved from the open position 5a to the closed position 5b, so that the wheel cylinder 7 is disconnected from the master cylinder 1. When the tendency for free rotation continues even if in a closed position 5b of the mode selection valve 5, the ECU 24 issues a signal for operating the piezo-electric hydraulic pressure pump 4, so that a pressure is generated in the wheel cylinder 7, which causes a braking force to be generated to decrease the driving force of the wheel, so that the tendency for free rotation of the wheels is canceled. After this procedure, in order to obtain a suitable wheel speed, the pressure control mode is suitably switched between the pressure increase mode, holding mode and pressure decreasing mode in such a manner that a suitable pressure in the wheel cylinder is obtained.

As described above, the construction of the present invention makes it possible to use the same components between the ABS device and the TRC device, which allows the entire system including ECU (electronic control unit 24) to be compact, and an algorithm for obtaining the desired control to be simplified. Furthermore, in the above embodiment, the electromagnetic mode selection valve 5 can disconnect the wheel cylinder 7 from the master cylinder 1 not only in the TRC operation but also in the ABS operation. As a result, no reaction force is transmitted to the brake pedal 2 from the wheel cylinder 7 during the ABS and TRC controls.

Figure 8:
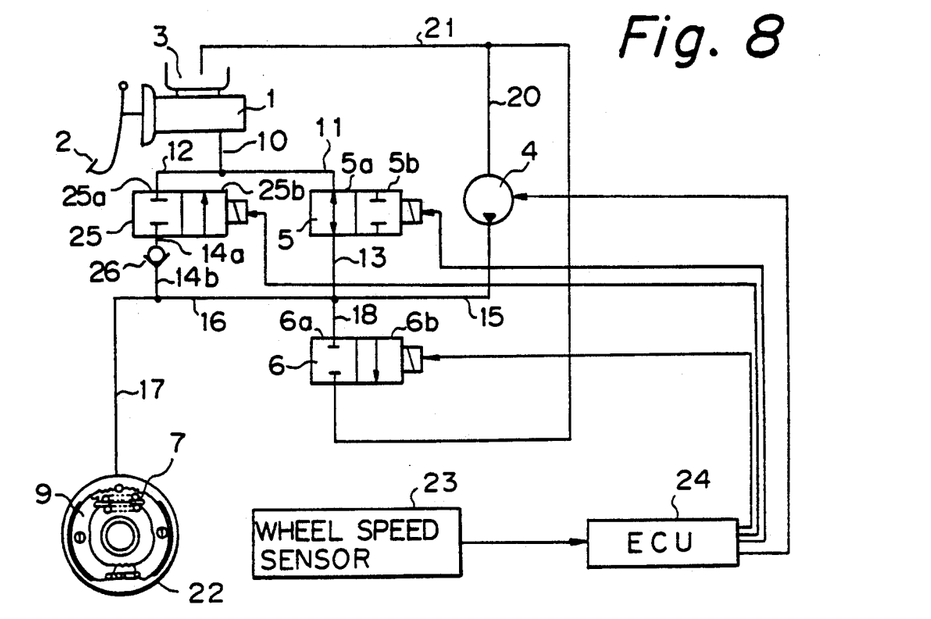
FIG. 8 shows another embodiment of the present invention.

A second embodiment will now be described in reference to FIG. 8 wherein in place of hydraulic switching valve 8 in FIG. 2, a electromagnetic operated valve is used. In FIG. 8, the same numbers are used for the same or equivalent part, and the detailed explanation thereof will be omitted. The embodiment in FIG. 8 is different from that in FIG. 2 in that in place of hydraulic switching valve 8, a combination of an electromagnetic mode selection valve 25 and a check valve 26 are used. Namely, the valve 25 is arranged between the pipe 12 from the master cylinder 1 and a pipe 14a to the check valve 26 connected to a pipe 14b to the wheel cylinder 7. The electromagnetic valve 25 is moved between an open position 25b where the pipe 12 is connected with the pipe 14a, and a closed position 25a where these pipes 12 and 14a are disconnected from each other. The electromagnetic valve 25 receives signals from the ECU to obtain a desired operation thereof. The operation of the various components in FIG. 7 are shown by the following table.

TABLE 2

| | | Piezo-electric Hydraulic Pump 4 | Electromagnetic Mode Valve 5 | Electromagnetic Pressure Reduction Valve 6 | Electromagnetic Mode Selection Valve 25 |
|---|---|---|---|---|---|
| ABS Control | Increase Pressure | ON | 5b | 6a | 25b |
| | Hold | OFF | 5b | 6a | 25b |
| | Pressure Decrease | OFF | 5b | 6b | 25b |
| TRC Control | Pressure Increase | ON | 5b | 6a | 25a |
| | Pressure Hold | OFF | 5b | 6a | 25a |
| | Pressure Decrease | OFF | 5b | 6b | 25a |

As shown in the above Table 2, upon ABS control, the mode selection valve 25 is switched to the position 25b, which corresponds to the position 8b of the pressure switching valve 8 in FIG. 2, where the spool 50 is moved in the left-hand direction so as to rest on the shoulder 52a due to the pressure at the chamber 52c opened to the master cylinder 1, so that the check valve 55 can open when the pressure in the wheel cylinder 7 is higher than that in the master cylinder 1, so that the pressure in the wheel cylinder 7 is prevented from being larger than that in the master cylinder 1. Contrary to this, in the embodiment in FIG. 7, upon the TRC operation, the electromagnetic mode selection valve 25 is switched to an open position 25b for connecting the master cylinder 1 with the wheel cylinder 7 via the check valve 25, which is opened when the pressure in the wheel cylinder 7 is higher than that in the master cylinder 1, which prevents the pressure in the wheel cylinder 7 from being higher than that in the master cylinder 1. Upon the TRC control, the electromagnetic mode selection valve 25 is switched to a position 25a where the wheel cylinder 7 is disconnected from the master cylinder 1, and the pressure in the wheel cylinder 7 is controlled by the hydraulic pump 4. The position 25b of the mode selection valve 25 in FIG. 8 corresponds to the position 8a of the hydraulic pressure switching valve 8 in FIG. 2. The system in FIG. 8 is disadvantageous over the system in FIG. 2 in that, in addition to the electromagnetic mode selection valve 5, an additional electromagnetic mode selection valve 25 is provided, which is differently operated between the ABS control and the TRC control, which makes the size of system larger than that in FIG. 2; however, the system in FIG. 8 is still improved with reference to the prior art system.

In place of arranging the check valve 26 between the electromagnetic mode selection valve 25 and the wheel cylinder 7, it can be arranged between the electromagnetic mode selection valve 25 and the master cylinder 1 in order to obtain the same operation. Furthermore, the electromagnetic mode selection valve 25 may be, in place of the normally closed type as shown in FIG. 8, a normally open type, but in the latter case, the electromagnetic valve 25 is OFF during the ABS control and ON during the TRC control.

Figure 9:
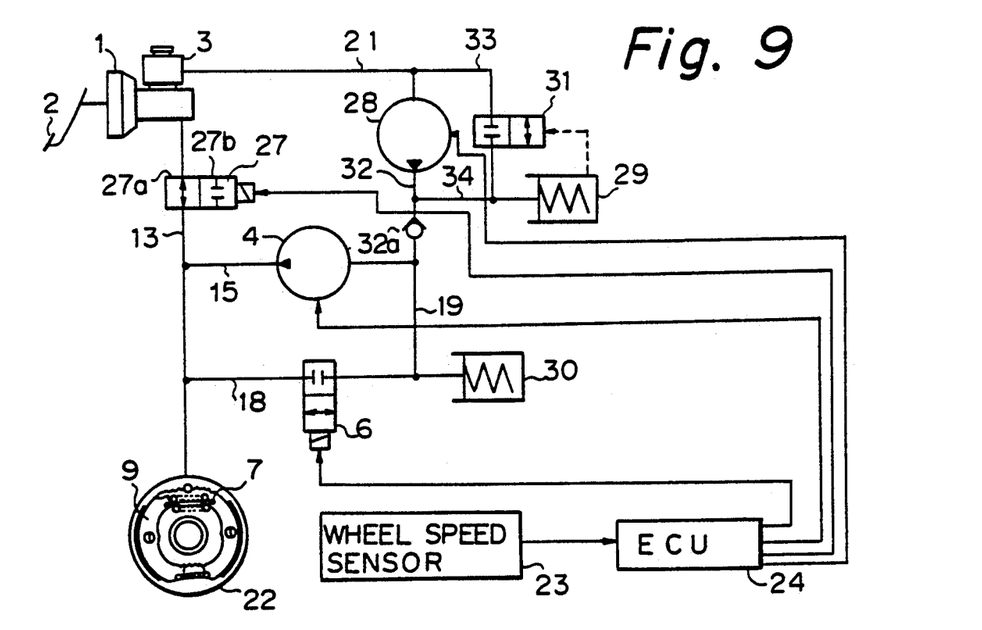
FIG. 9 shows still another embodiment of the present invention.

FIG. 9 shows a third embodiment. In this embodiment, in addition to the piezo-electric hydraulic high pressure pump 4 in the first and second embodiments, a feed pump 28 is provided at the inlet of the piezo-electric hydraulic high pressure pump 4 to increase the performance of a high speed intermittent operation thereof. The feed pump 28 may have a simplified construction which is enough to increase an intake efficiency of the piezo-electric hydraulic high pressure pump 4. Therefore, the provision of the feed pump 4 does not contradict the concept of the present invention regarding the reduction of the size of the total system. In this embodiment, the hydraulic switching valve 8 in FIG. 1 is eliminated.

The feed pump 28 is, at its inlet, connected to the pipe 21 and to the reservoir 3, and is, at its output connected to the inlet of the high pressure pump 4 and to a pipe 19 to the electromagnetic pressure reduction valve 6, via a pipe 32 with a check valve 32a. A sub-reservoir tank 29 is connected to the pipe 32 from the feed pump 28 via a pipe 34. A pressure control valve 31 as a two port valve is arranged on a pipe 33 which by-passes the feed pump 28. Another sub-reservoir tank 30 is connected to the pipe 19 to the electromagnetic pressure reduction valve 6.

Figure 10:
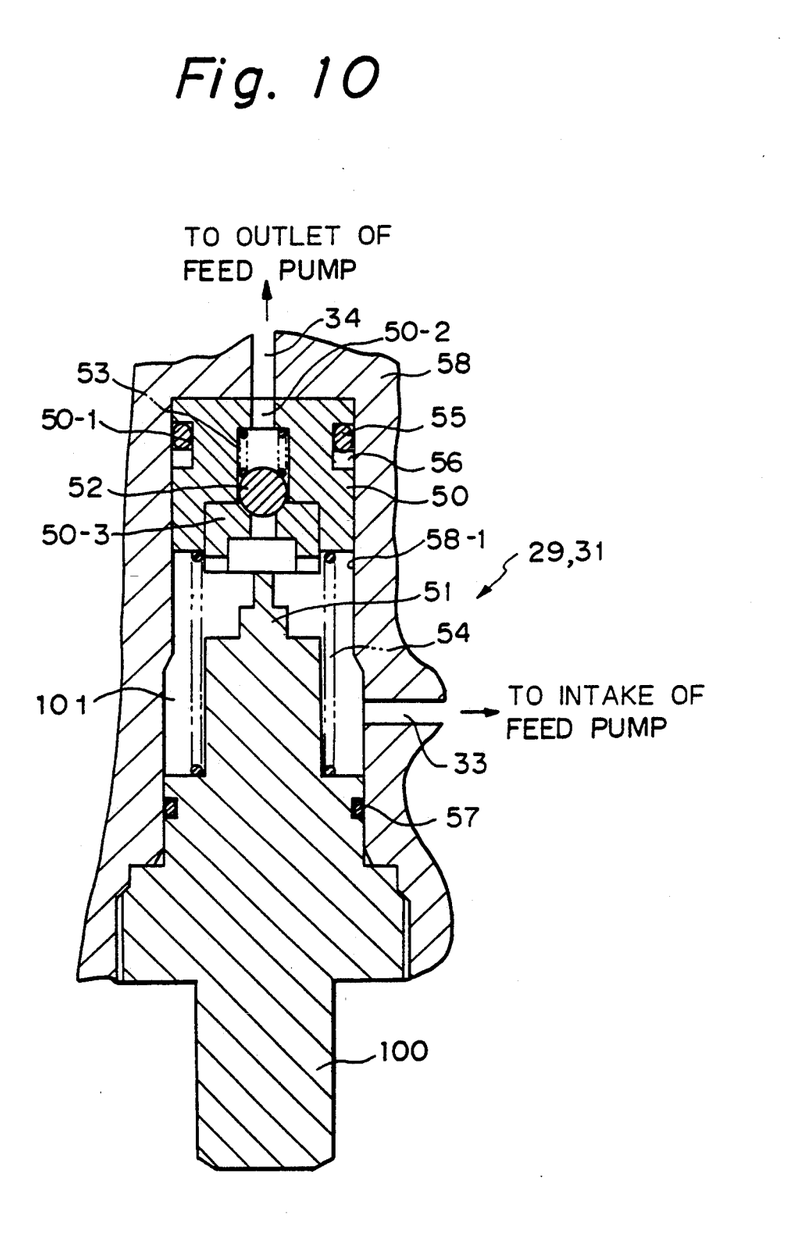
FIG. 10 is a cross sectional view of the sub-reservoir tank and hydraulic pressure switching valve as unified in the embodiment in FIG. 9.

The sub-reservoir tank 29 and the pressure switching valve 31 has a unified construction as shown in FIG. 10 in detail. In FIG. 10, a housing 58 has a cylinder bore 58-1, in which a piston 50 is slidably stored. A block 100 is fixedly connected to the housing 58 via a seal ring 57 at an end opposite the piston 50 so that a chamber 101 is formed between the piston 50 and the block 100 in the cylinder bore 58-1. A pipe 33 is, at its one end, opened to the chamber 101, and the other end of the pipe 33 is connected to the pipe 21 on the inlet side of the feed pump 21 as shown in FIG. 9. The piston 50 has an annular outer groove 50-1, in which an O-ring 55 and a back-up ring 56 are stored for obtaining a seal function when the piston 50 slides in the cylinder bore 58-1. The piston 50 has an inner axial bore 50-2 therethrough which is connected to the pipe 34 to the pipe 32 from the feed pump 28 in FIG. 10, in which axial bore 50-2 and a check valve 52 is arranged. The block 100 has at an end facing the piston 50 an integral push rod 51 which extends toward the end of the axial bore 50-2. A spring 53 urges the check valve 52 to normally rest on a valve seat 50-3. A spring 54 is arranged in the chamber 101 for urging the piston 50 to move upward.

Now an operation of the sub-reservoir 29 and the pressure switching valve 31 will be described. The brake fluid pressurized by the feed pump 28 is supplied, via the conduits 32 and 34, to the bore 50-2, which generates a force allowing the piston 50 to move downward against the force of the spring 54 so that a space is formed in the cylinder bore 58-1 above the piston 50, while the check valve 52 maintains a closed position to the valve seat 50-3. As a result, the brake liquid from the feed pump 28 is stored in the space that functions as the sub-reservoir 29. When a predetermined downward stroke of the piston 50 is obtained, i.e., a predetermined amount of the brake liquid is stored in the space, the push rod 51 contacts the check ball 52, which causes it to be lifted from the valve seat 50-3, so that the brake liquid in the space on the outlet side of the feed pump 28 is issued, via the chamber 101 and the conduit 33, to the inlet side of the feed pump 28. As a result, the pressure in the reservoir tank 29 is maintained so as not to be larger than a predetermined value determined by the set force of the spring 54.

It should be noted that the set pressure for commencing the relief operation at the sub-reservoir 29 is smaller than the set pressure for commencing the relief operation at the reservoir 30, which prevents the liquid from accumulating when the feed pump 28 is operated.

We claim:

1. A brake system for a wheel in a vehicle, said system capable of obtaining an anti-skid operation for preventing the locking of the wheel when the wheel is subjected to a brake operation as well as a traction control operation for preventing free rotation of the wheel when the vehicle is started or accelerated, said system comprising:

a brake pedal;

a reservoir tank storing a brake fluid under atmospheric pressure;

a master cylinder connected to the brake pedal generating a hydraulic pressure when the brake pedal is depressed;

a wheel cylinder arranged in the wheel of the vehicle obtaining a braking operation when the hydraulic pressure is applied thereto;

a main conduit connecting the master cylinder to the wheel cylinder;

cut-off valve means arranged in the main conduit for disconnecting the wheel cylinder from the master cylinder when said anti-skid operation or traction control operation is required;

a relief conduit connecting the main conduit, at a position between the cut-off valve and the wheel cylinder, to the reservoir tank, for returning an amount of liquid into the tank;

relief valve means arranged in the relief conduit for communicating between the wheel cylinder and the reservoir tank when a reduction of pressure in the wheel cylinder is required during said anti-skid control or said traction control;

a supply conduit connecting the main conduit, at a position between the cut-off valve means and the wheel cylinder, to the reservoir tank; and pump means arranged in said supply conduit and operated intermittently for supplying the brake fluid from the reservoir tank to the wheel cylinder when an increase in the pressure in the wheel cylinder is required during said anti-skid control or said traction control.

2. A brake system according to claim 1, wherein said pump is a piezo-electric hydraulic pump.

3. A brake system according to claim 1, further comprising a feed pump in the supply line upstream from said pump means; said feed pump supplementing the brake fluid from the reservoir tank to the pump means.

4. A brake system according to claim 1, further comprising:

an axiliary conduit between the master cylinder and the wheel cylinder which is parallel to the main conduit; and switching valve means on said auxiliary conduit for communicating from the master cylinder to the wheel cylinder via said auxiliary conduit when a usual braking operation is carried out, and for obtaining a one way communication from the wheel cylinder to the master cylinder via said auxiliary conduit when the anti-skid control is carried out while disconnecting the wheel cylinder to the master cylinder when the traction control is obtained.

5. A brake system according to claim 4, wherein said switching valve means comprises:
   a valve housing;
   a spring urged spool slidable in the housing;
   a chamber on one side of the spool defining therein a bore;
   a check ball on one side of the spool in said chamber; and
   means for locking the check ball to close the bore, the chamber being in communication with the high pressure in the master cylinder when the brake pedal is depressed for urging the spool against the force of the spring, so that the check ball is freed from the locking means, permitting the check ball to be displaced to open the bore for communication between the wheel cylinder and the master cylinder for preventing the pressure in the wheel cylinder from being larger than the pressure in the master cylinder.

6. A brake system according to claim 4, wherein: said switching valve means comprises an electromagnetic valve that is opened when the anti-skid operation is carried out and is closed when the traction control is carried out; and a check valve arranged in series with the electromagnetic valve so that one way flow from the wheel cylinder to the master cylinder is allowed.

7. A brake system for a wheel in a vehicle, said system capable of obtaining an anti-skid operation for preventing the locking of the wheel when the wheel is subjected to a brake operation as well as a traction control operation for preventing free rotation of the wheel when the vehicle is started or accelerated, said system comprising:
   a brake pedal;
   a reservoir tank storing a brake fluid under atmospheric pressure;
   a master cylinder connected to the brake pedal generating a hydraulic pressure when the brake pedal is depressed;
   a wheel cylinder arranged in the wheel of the vehicle obtaining a braking operation when the hydraulic pressure is applied thereto;
   a main conduit connecting the master cylinder with the wheel cylinder;
   a supply conduit connecting the reservoir tank with the wheel cylinder;
   pump means arranged in the supply conduit for obtaining an increased pressure of the brake fluid from the reservoir tank to the wheel cylinder when the pump means is operated;
   means for switching between a condition where the brake fluid from the pump means is introduced into the wheel cylinder for increasing the pressure at the wheel cylinder and a position where the brake fluid in the wheel cylinder is discharged to the reservoir tank for decreasing the pressure at the wheel cylinder, while the master cylinder is disconnected from the wheel cylinder, when the anti-skid control or the traction control is carried out, and;
   switching valve means on the main conduit for obtaining a communication from the master cylinder to the wheel cylinder when a usual braking operation is carried out, and for obtaining a one way communication from the wheel cylinder to the master cylinder when the anti-skid control is carried out while disconnecting the wheel cylinder to the master cylinder when the traction control is obtained.

8. A brake system for a wheel in a vehicle, said system capable of obtaining an anti-skid operation for preventing the locking of the wheel when the wheel is subjected to a brake operation as well as a traction control operation for preventing free rotation of the wheel when the vehicle is started or accelerated, said system comprising:
   a brake pedal;
   a reservoir tank storing a brake fluid under atmospheric pressure;
   a master cylinder connected to the brake pedal generating a hydraulic pressure when the brake pedal is depressed;
   a wheel cylinder arranged in the wheel of the vehicle obtaining a braking operation when the hydraulic pressure is applied thereto;
   a main conduit connecting the master cylinder to the wheel cylinder;
   cut-off valve means arranged in the main conduit for disconnecting the wheel cylinder from the master cylinder when said anti-skid operation or traction control operation is required;
   a relief conduit connecting the main conduit, at a position between the cut-off valve and the wheel cylinder, to the reservoir tank, for returning an amount of liquid into the tank;
   relief valve means arranged in the relief conduit for communicating between the wheel cylinder and the reservoir tank when a reduction of pressure in the wheel cylinder is required during said anti-skid control or said traction control;
   a supply conduit connecting the main conduit, at a position between the cut-off valve means and the wheel cylinder, to the reservoir tank;
   pump means arranged in said supply conduit and operated intermittently for supplying the brake fluid from the reservoir tank to the wheel cylinder when an increase in the pressure in the wheel cylinder is required during said anti-skid control or said traction control;
   a feed pump in the supply line upstream from the pump means, said feed pump supplementing the brake fluid from the reservoir tank to the pump means; and
   means for defining a reservoir on the output side of the feed pump for storing an amount of brake fluid at the output of the feed pump, and pressure discharge means for connecting the reservoir tank to the inlet side of the feed pump when a predetermined pressure is obtained at the reservoir tank.

* * * * *